United States Patent [19]
Ajanovic et al.

[11] Patent Number: 6,112,307
[45] Date of Patent: Aug. 29, 2000

[54] METHOD AND APPARATUS FOR TRANSLATING SIGNALS BETWEEN CLOCK DOMAINS OF DIFFERENT FREQUENCIES

[75] Inventors: Jasmin Ajanovic; Dahmane Dahmani, both of Folsom; Kenneth Chris Holland, El Dorado Hills; Narendra Khandekar, Folsom, all of Calif.

[73] Assignee: Intel Corporation, Santa Clara, Calif.

[21] Appl. No.: 08/552,460

[22] Filed: Nov. 9, 1995

Related U.S. Application Data

[63] Continuation of application No. 08/176,399, Dec. 30, 1993.

[51] Int. Cl.[7] .................................................. G06F 1/08
[52] U.S. Cl. ............................................ 713/400; 713/503
[58] Field of Search .............................. 395/550, 551–53, 395/555–560; 713/400, 503

[56] References Cited

U.S. PATENT DOCUMENTS

| | | | |
|---|---|---|---|
| 4,405,898 | 9/1983 | Flemming | 364/900 |
| 4,893,271 | 1/1990 | Davis et al. | 364/900 |
| 5,077,686 | 12/1991 | Rubinstein | 395/550 |
| 5,191,657 | 3/1993 | Ludwig et al. | 395/325 |
| 5,256,994 | 10/1993 | Langendorf | 331/16 |
| 5,309,561 | 5/1994 | Overhouse et al. | 395/200 |
| 5,336,939 | 8/1994 | Eitrheim et al. | 307/269 |
| 5,448,715 | 9/1995 | Lelm et al. | 395/550 |
| 5,459,855 | 10/1995 | Lelm | 395/550 |
| 5,471,587 | 11/1995 | Fernando | 395/309 |
| 5,537,581 | 7/1996 | Conary et al. | 395/550 |
| 5,537,582 | 7/1996 | Draeger | 395/550 |

*Primary Examiner*—Majid A. Banankhah
*Attorney, Agent, or Firm*—Blakely, Sokoloff, Taylor & Zafman LLP

[57] ABSTRACT

A synchronizing circuit translates signals in a slow clock domain into a fast clock domain. The frequency of the slow clock is a submultiple of the fast clock frequency. A synchronizing pulse signal is developed at the frequency of the slow clock, but is phase synchronized to the fast clock. The synchronizing pulse signal is employed to gate the signal in the slow clock domain so that it is synchronized in the fast clock domain. In a system where the ratio between the fast clock frequency and slow clock frequency is determined by a frequency divisor signal, a snooping circuit is employed to capture the frequency divisor signal to achieve rapid synchronization between the clock domains.

8 Claims, 4 Drawing Sheets

METHOD AND APPARATUS FOR TRANSLATING SIGNALS BETWEEN CLOCK DOMAINS OF DIFFERENT FREQUENCIES

This is a continuation/of application Ser. No. 08/176,399 filed Dec. 30, 1993

BACKGROUND OF THE INVENTION

1. Field of the Invention

This invention relates generally to the field of data processing systems, and particularly to a method and apparatus for synchronizing signals in one clock domain with another clock domain.

2. Background Art

Most present day personal and workstation computers are organized as shown in FIG. 1. A central processing unit (CPU) 10 is coupled to a local CPU bus 12 as is the main memory 14. A cache memory 16 may also be coupled to bus 12. Communication with peripheral devices 22 is accomplished over an expansion bus 20 coupled to I/O port 18. A number of expansion bus standards have been developed. One such standard is the industry standard architecture (ISA) bus that is widely used in personal computer systems. More recently, the extended ISA (EISA) bus has been developed. This is a superset of the ISA bus that includes all ISA bus features, together with extensions to enhance system performance and capabilities. Both the ISA bus and EISA bus have relatively narrow bandwidths in comparison to the bandwidth available on local busses for state-of-the-art high performance CPUs. This results in I/O bottlenecks and limits the ability of the system to service high performance peripherals such as local area network (LAN), SCSI, graphics and video.

In order to deal with the inherent limitations of earlier generation expansion bus standards, a new bus standard designated the "Peripheral Component Interconnect" (PCI) bus has been developed. PCI is a fast local bus particularly adapted for servicing high performance peripheral units. A typical system employing a PCI bus is illustrated in FIG. 2. Here, CPU 10 is coupled to CPU bus 12 as in the previously described system. A PCI/host bridge unit 30 is coupled to CPU bus 12 to provide the interface with PCI bus 32. PCI/host bridge unit 30 preferably also includes the management functions for the main memory 14 and cache memory 16. PCI compatible peripheral units 34 are connected to the PCI bus.

In order to maintain system compatibility with peripheral units designed to operate with earlier generation ISA/EISA expansion busses, a PCI/expansion bus bridge unit 40 is coupled between the PCI bus and the ISA or EISA expansion bus 20. A system such as shown in FIG. 2 is thus able to take advantage of the increased performance capabilities of the PCI bus while maintaining access to the large existing base of ISA and EISA expansion cards and their corresponding software applications.

The PCI bus is particularly designed to address the growing need for a standardized local bus that is not directly dependent on the speed and size of the CPU bus. New generations of personal computer system software with sophisticated graphical interfaces, multi-tasking and multi-threading bring new requirements that traditional PC input/output architectures cannot satisfy. As indicated in FIG. 2, the input/output functions of the system are decoupled from the processor and memory assets, thereby enabling the input/output design of the system to remain stable over multiple generations of processor and/or memory technology. Regardless of new requirements or technology applied on the CPU side of the host bridge, the PCI side may remain unchanged, which allows re-usability of not only the remainder of the platform chip set, including the PCI/expansion bus bridge, but also all of the other I/O functions interfaced at both the PCI and expansion bus levels.

The PCI/expansion bus bridge unit 40 integrates several bus functions on both the PCI and expansion busses. For the PCI local bus, the functions include PCI local bus arbitration and default bus driver. In the case of an EISA expansion bus, the central functions include the EISA bus controller, EISA arbiter and EISA data swap logic. The PCI/EISA bridge also integrates system functions, including PCI parity and system error reporting, buffer coherency management protocol, PCI and EISA memory and I/O address mapping and decoding. For maximum flexibility, all of these functions are programmable, thereby allowing for a variety of optional features. A particular PCI/EISA bridge set has been developed for the Intel Pentium™ processor. This chip set is illustrated in FIG. 3 and comprises a PCI/EISA bridge (PCEB) and a EISA system component (ESC). These two components work in tandem to provide an EISA I/O subsystem interface for personal computer platforms based on the Pentium™ processor chip and PCI bus standard.

The hierarchy of the CPU bus as the execution bus, PCI local bus as a primary I/O bus and EISA bus as a secondary I/O bus allows concurrency for simultaneous operations in all three bus environments. Data buffering permits concurrency for operations that cross over from one bus environment to another. For example, a PCI device may post data into the PCEB, permitting the PCI local bus transaction to complete in a minimum time and freeing up the PCI local bus for further transactions. The PCI device need not wait for the transfer to complete to its final destination. Meanwhile, any ongoing EISA bus transactions are permitted to complete. The posted data will then be transferred to its EISA bus destination when the EISA bus is available. The PCEB-ESC chip set implements extensive buffering for PCI-to-EISA and EISA-to-PCI bus transactions. In addition to concurrency for the operation of the cross-bus environments, data buffering allows advantage to be taken of the fastest operations within a particular bus environment via PCI burst transfers and EISA burst transfers.

The PCI local bus with 132 MByte/second and EISA with 33 MByte/second peak data transfer rates represent bus environments with significantly different bandwidths. Without buffering, transfers that cross between bus environments would be performed at the speed of the slower bus. Data buffers provide a mechanism for data rate adoption so that the usable bandwidth of the fast bus environment (PCI) is not significantly impacted by the slower bus environment (EISA).

The PCEB can be either a master or slave on the PCI local bus and it is optimized for bus frequencies from 25 megahertz to 33 megahertz. For PCI-initiated transfers, the PCEB functions only as a slave. For EISA-initiated transfers to the PCI local bus, the PCEB is a PCI master. The PCEB contains a fully EISA master and slave interface. The PCEB directly drives eight EISA slots without external data or address buffering. The PCEB functions as a master or slave on the EISA bus only for transfers between the EISA bus and PCI local bus. For transfers confined to the EISA bus, the PCEB functions neither as a master nor slave. However, the data swap logic contained in the PCEB is involved in such transfers if data size translation is required.

The ESC implements system functions, such as timer/counter, DMA, and interrupt controller. The ESC also implements EISA sub-system control functions, such as EISA bus controller and EISA bus arbiter.

SUMMARY OF THE INVENTION

The present invention provides a mechanism for ensuring rapid synchronization of the PCEB and ESC units when the CPU commands a change in the PCI clock frequency and for translating signals in the EISA (slow) clock domain into signals that can be propagated in the PCI (fast) clock domain.

The PCI bus is snooped for access to a clock divisor control register. The value of the clock divisor controls the generation of the EISA clock as a submultiple of the PCI clock. The EISA clock is generated in the ESC unit. When acceptance of a new clock divisor is sensed by the snooping circuitry in the PCEB, the clock divisor is latched and the PCEB timing circuitry is adjusted accordingly to maintain synchronism with the ESC.

Synchronizer circuitry in the PCEB translates signals from the EISA clock domain into the PCI clock domain. A synchronizing pulse signal is developed at the frequency of the EISA clock, but phase synchronized to the PCI clock. The synchronizing pulse signal is employed to gate the EISA clock domain signal so that it is synchronized in the PCI clock domain.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, devices and circuits are omitted so as to not obscure the description of the present invention with unnecessary detail.

Figure 1:
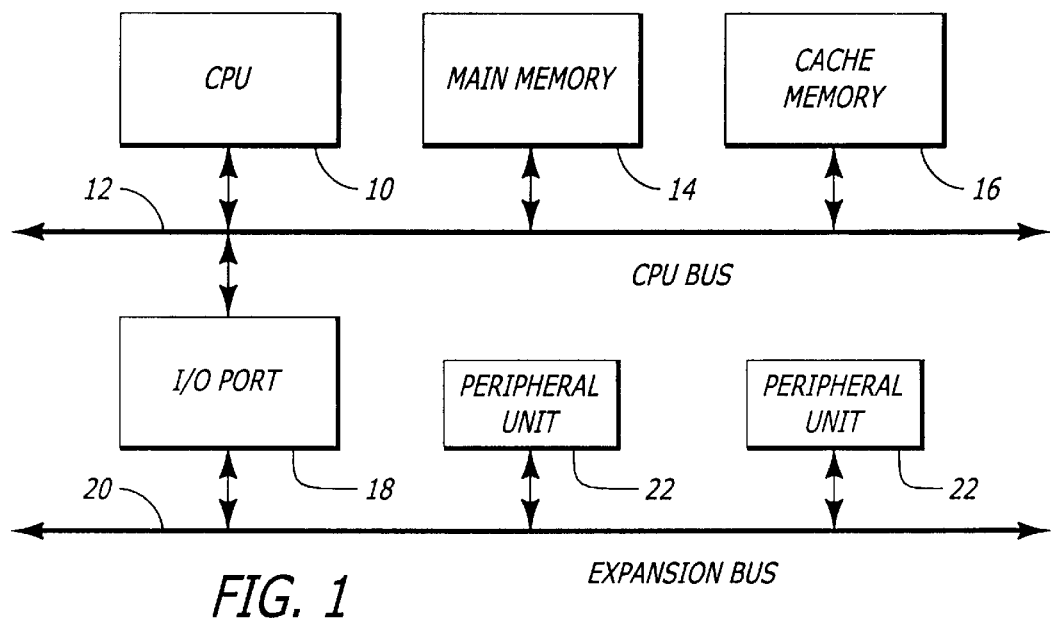
FIG. 1 is a simplified block diagram of a prior art computer system.
Figure 2:
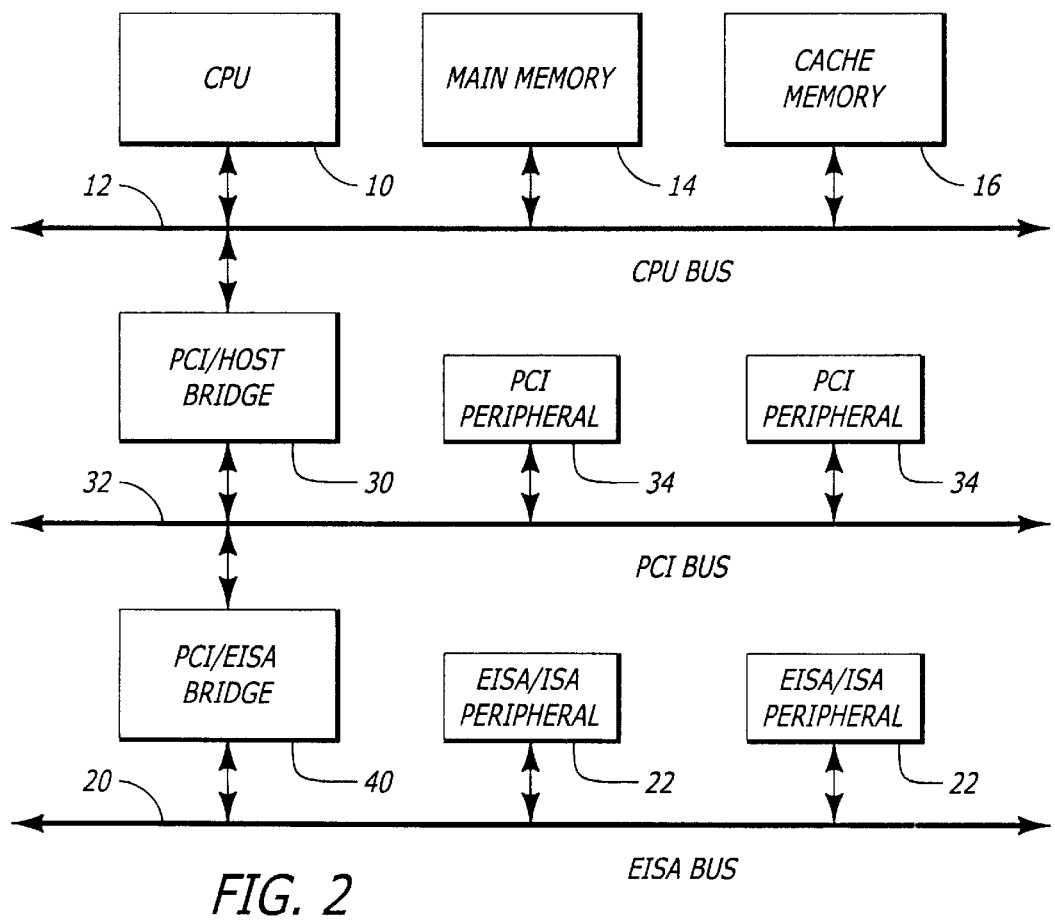
FIG. 2 is a simplified block diagram of a computer system incorporating a peripheral component interconnect (PCI) bus.
Figure 3:
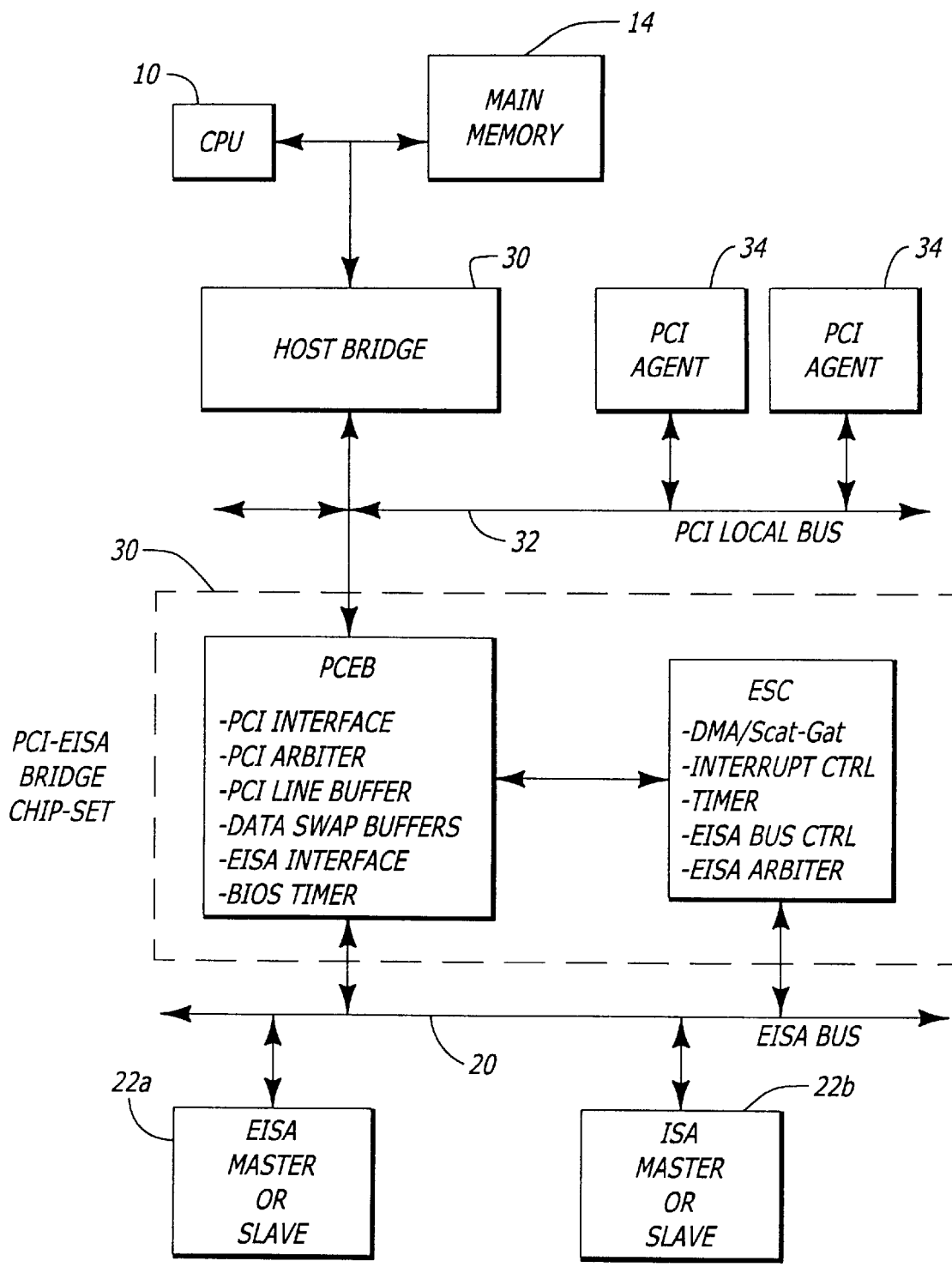
FIG. 3 is a simplified block diagram of a PCI/expansion bus bridge.
Figure 4:
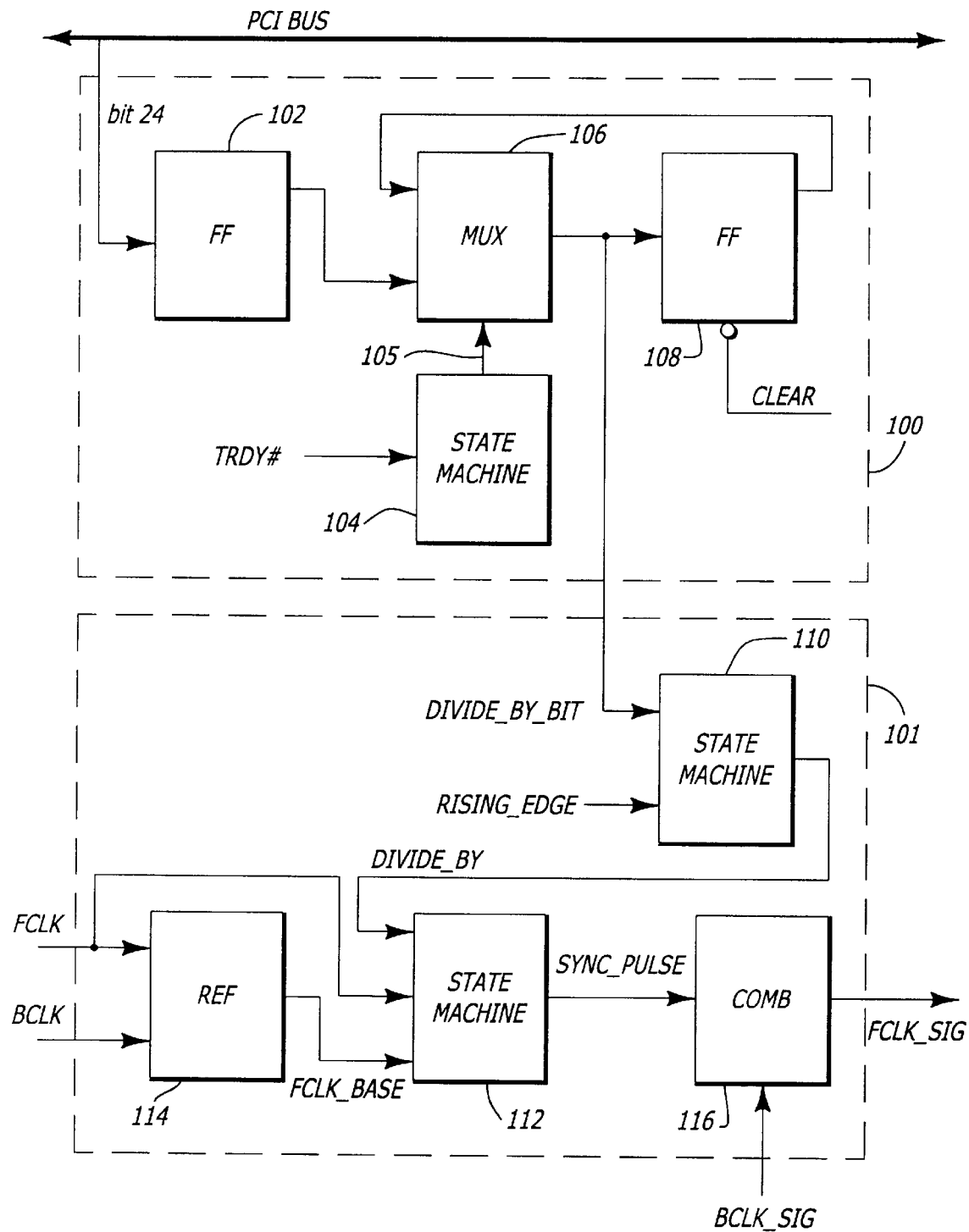
FIG. 4 is a block diagram of a signal synchronizing circuit according to the present invention.

FIG. 4 illustrates the implementation of the present invention within the PCEB. There are two main functional blocks. These are the snooping mechanism block 100 and the synchronizer block 101. The CPU can change the frequency of its clock, and hence the frequency at which the PCI bus operates, on the fly. This requires that both the PCEB and ESC likewise change the frequency of their respective operations. This is accomplished by reprogramming a configuration register in the ESC. The PCEB and ESC work in tandem, and therefore must synchronize the change in frequency of their internal operations. Such synchronization is accomplished primarily within the PCEB by first snooping the frequency change request and then adjusting the internal timing circuitry to the newly requested frequency.

The CPU effects frequency changes by writing to I/O ports 22*h* and 23*h*. This loads the configuration registers in the ESC with the appropriate values. These I/O registers are used as an index address register (22*h*) and an index data register (23*h*). The index address register is used to write the configuration register address. The data (i.e., the configuration register address) in register 22*h* is used to select a particular configuration register. The selected configuration register is written to with a write operation to the index data register at I/O address 23*h*. The speed of the EISA bus is controlled by the EISA clock divisor in register location 4Dh. The EISA bus clock is divided down from the PCI clock by a factor of four (for a PCI clock frequency of 33.33 megahertz) or a factor of three (for a PCI clock frequency of 25 megahertz). Thus, in either case, the EISA clock frequency is maintained at 8.33 megahertz. It will be recognized that other embodiments may have additional primary I/O bus frequency options, in which case the clock divisor may assume any of a plurality of values as necessary to divide the clock frequency down to an appropriate value for operation of the secondary I/O bus.

The snooping mechanism block 100 permits the PCEB to sense a change in the EISA bus frequency concurrently with receipt of the frequency change request in the ESC configuration register. The ESC and the PCEB are thereby able to simultaneously change frequency after the I/O write to port 23*h* completes. Flip flop 102 receives bit 24 directly from the PCI bus. This bit carries the clock divisor bit when the EISA clock divisor register is written to. State machine 104 is idle until there is a write to I/O port 22*h*. State machine 104 then waits until there is a write to I/O 23*h*. It monitors the write and looks for successful completion as indicated as by the assertion of a target ready signal on the PCI bus. The assertion of the signal indicates that the ESC was able to latch the value of the clock divisor bit in the appropriate register. State machine 104 then asserts a mux selection signal on line 105 to latch the value of the clock divisor bit in flip flop 108. Prior to receipt of the target ready signal from the ESC, multiplexer 106 feeds the output of flip flop 102 through to the input of flip flop 108. Flip flop 108 is cleared by a system reset to force the clock divisor bit stored therein to the default value. The output of multiplexer 106 is designated DIVIDE_BY_BIT and constitutes a PCEB copy of the clock divisor bit latched in the ESC configuration register. This enables the PCEB to adjust its internal timing circuitry concurrently with adjustment of the ESC's internal timing circuitry so that the two units remain in synchronism.

DIVIDE_BY_BIT is asserted as an input at frequency shift state machine 110 of synchronizer block 101. This block synchronizes slow clock (BCLK) signals to the fast clock (FCLK) more quickly than conventional techniques. Proper operation of synchronizer block 101 requires that one edge of each clock maintains a stable relationship with the other and that both edges are in the same direction (i.e., one clock edge does not skew through the other clock edge and both edges must be either falling or rising). In addition, the frequency of BCLK must be an integer submultiple of the frequency of FCLK.

Figure 5:
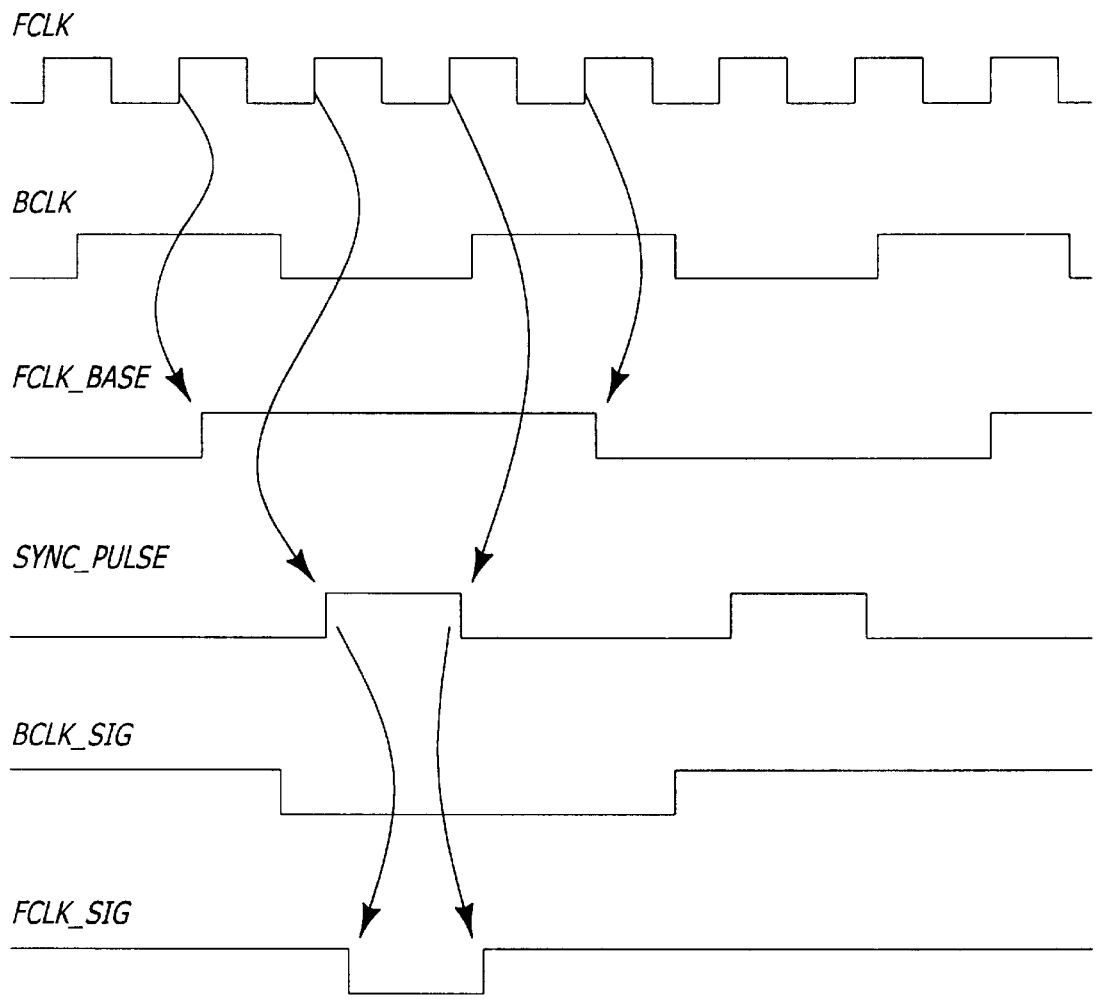
FIG. 5 is a timing diagram illustrating the operation of the circuit of FIG. 4.

The output of state machine 110, designated as signal DIVIDE_BY, is synchronized with the rising edge of the PCI clock signal (FCLK). Signal DIVIDE_BY is asserted as an input to synchronizing state machine 112. State machine 112 also receives as inputs the PCI clock signal (FCLK) and the output FCLK_BASE from reference block 114. Signal FCLK_BASE has a frequency equal to one-half of the EISA clock frequency (BCLK), but is synchronized to FCLK. The timing relationship of FCLK_BASE to the fast and slow clock signals FCLK and BCLK is shown on the top three lines of FIG. 5.

Synchronizing state machine 112 generates output signal SYNC_PULSE based on the polarities of DIVIDE_BY and FCLK_BASE. A data signal in the EISA domain is designated BCLK_SIG. Knowing when this signal is stable relative to FCLK_BASE, the SYNC_PULSE signal is generated in the appropriate FCLK cycle to allow a stable value on BCLK_SIGNAL to pass into the PCI (FCLK) time domain. Thus, the value on BCLK_SIGNAL is synchronized to the FCLK time domain by combinatorial block 116.

Referring again to FIG. 5, it will be seen that signal SYNC_PULSE occurs at the rate of BCLK, but is synchronized with FCLK. The BCLK_SIG changes state on the falling edge of BCLK and is stable at the time that signal SYNC_PULSE is asserted. The BCLK_SIG propagates as FCLK_SIG during the interval of SYNC_PULSE.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. In a data processing system having a fast clock and a slow clock, wherein the slow clock has a frequency that is an integer submultiple of the fast clock, a method for synchronizing a data signal in the slow clock domain with the fast clock, wherein the data signal in the slow clock domain is stable at a time displaced from a change of state of the slow clock, said method comprising the steps of:

(a) generating a clock base signal at a frequency that is an integer submultiple of the slow clock and that is phase synchronized with the fast clock;

(b) generating a sync pulse signal responsive to the clock base signal, said sync pulse signal having a frequency that is an integer multiple of the clock base signal and that is phase synchronized with the fast clock for any of a range of stable phase relationships between the fast clock and the slow clock, so as to be displaced by a predetermined time from the clock base signal;

(c) generating a data signal in the fast clock domain by gating the slow clock domain data signal with the sync pulse signal while both the fast and slow clocks remain unchanged.

2. The method of claim 1 wherein the slow clock frequency is one of a plurality of predetermined submultiples of the fast clock that is selected by a clock divisor signal and wherein the method further comprises the step of snooping within the data processing system to capture the clock divisor signal.

3. A system for synchronizing a data signal in a slow clock domain with a fast clock wherein the slow clock has a frequency that is an integer submultiple of the fast clock and wherein the data signal in the slow clock domain is stable at a time displaced from a change of state of the slow clock, said system comprising:

(a) means for generating a clock base signal at a frequency that is an integer submultiple of the slow clock and that is phase synchronized with the fast clock;

(b) means for generating a sync pulse signal responsive to the clock base signal, said sync pulse signal having a frequency that is an integer multiple of the clock base signal and that is phase synchronized with the fast clock for any of a range of stable phase relationships between the fast clock and the slow clock, so as to be displaced by a predetermined time from the clock base signal;

(c) means for generating a data signal in the fast clock domain by gating the slow clock domain data signal with the sync pulse signal while the fast and slow clocks remain unchanged.

4. A system for synchronizing a data signal in a slow clock domain with a fast clock wherein the slow clock has a frequency that is an integer submultiple of the fast clock and wherein the data signal in the slow clock domain is stable at a time displaced from a change of state of the slow clock, said system comprising:

(a) a first signal generator that receives the fast clock and the slow clock and that generates a clock base signal therefrom that has a frequency that is an integer submultiple of the slow clock and that is phase synchronized with the fast clock;

(b) a synchronizing state machine coupled to the first signal generator that generates a sync pulse signal responsive to the clock base signal, said sync pulse signal having a frequency that is an integer multiple of the clock base signal and that is phase synchronized with the fast clock for any of a range of stable phase relationships between the fast clock and the slow clock, so as to be displaced by a predetermined time from the clock base signal;

(c) a second signal generator coupled to the synchronizing state machine, that receives the slow clock domain data signal and that generates a data signal in the fast clock domain by gating the slow clock domain data signal with the sync pulse signal while the fast and slow clocks remain unchanged.

5. A data processing system comprising:

(a) a central processing unit;

(b) a first interface bus operating at a fast clock frequency;

(c) a second interface bus operating at a slow clock frequency that is an integer submultiple of the fast clock frequency;

(d) a first signal generator that receives the fast clock and the slow clock and that generates a clock base signal therefrom that has a frequency that is an integer submultiple of the slow clock and that is phase synchronized with the fast clock;

(e) a synchronizing state machine coupled to the first signal generator that generates a sync pulse signal responsive to the clock base signal, said sync pulse signal having a frequency that is an integer multiple of the clock base signal and that is phase synchronized with the fast clock for any of a range of stable phase relationships between the fast clock and the slow clock, so as to be displaced by a predetermined time from the clock base signal;

(f) a second signal generator coupled to the synchronizing state machine, that receives a data signal in the slow clock domain, wherein the data signal in the slow clock domain is stable at a time displaced from a change of state of the slow clock, and that generates a data signal in the fast clock domain by gating the slow clock domain data signal with the sync pulse signal while the fast and slow clocks remain unchanged.

6. The data processing system of claim 5 further comprising a slow clock generating unit coupled to the first interface bus for receiving a clock divisor signal from the central processing unit and generating the slow clock at a frequency that is the fast clock frequency divided by a value of the clock divisor signal.

7. The data processing system of claim 6 further comprising a capture circuit coupled to the first interface bus for capturing the clock divisor signal as it is transmitted from the central processing unit.

8. The data processing system of claim 7 further comprising a latch coupled to the capture circuit for latching the clock divisor signal upon receipt of an acknowledgment signal from the slow clock generating unit that it received the clock divisor signal.

\* \* \* \* \*